W. S. HANCOCK.
SPRING WHEEL.
APPLICATION FILED NOV. 27, 1912.
1,070,458.
Patented Aug. 19, 1913.
2 SHEETS—SHEET 1.
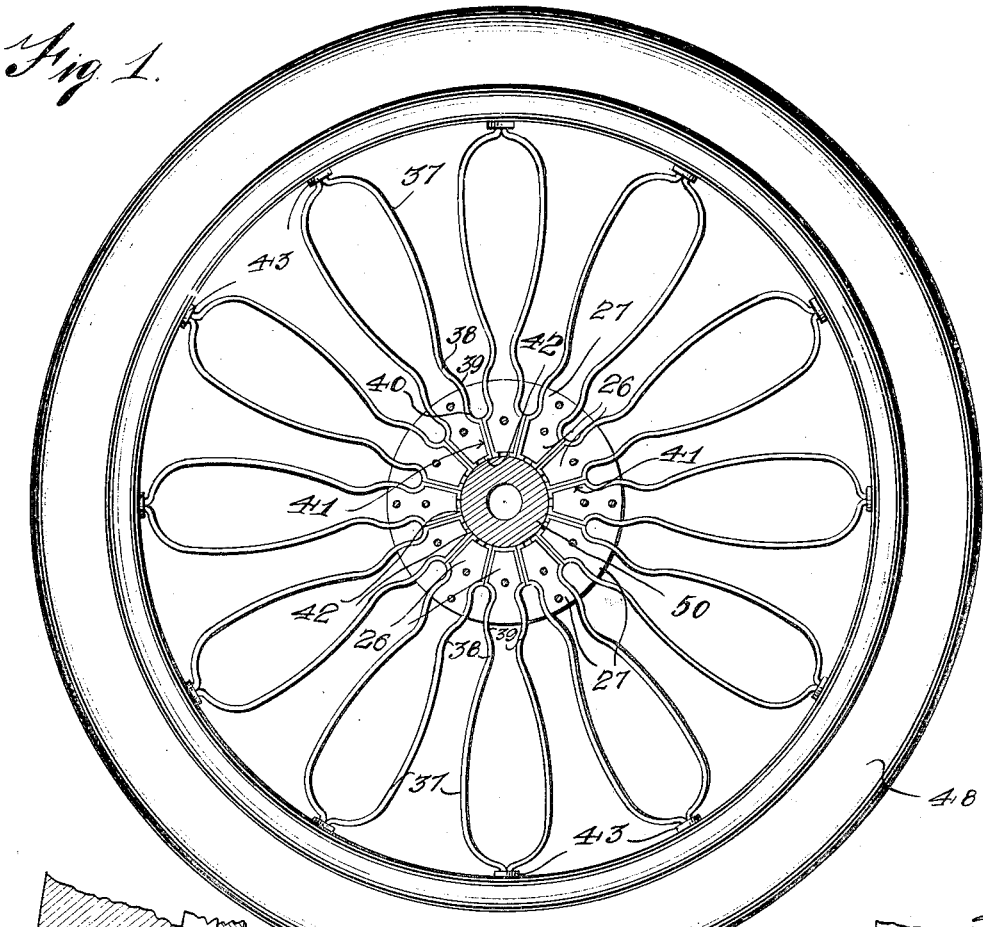
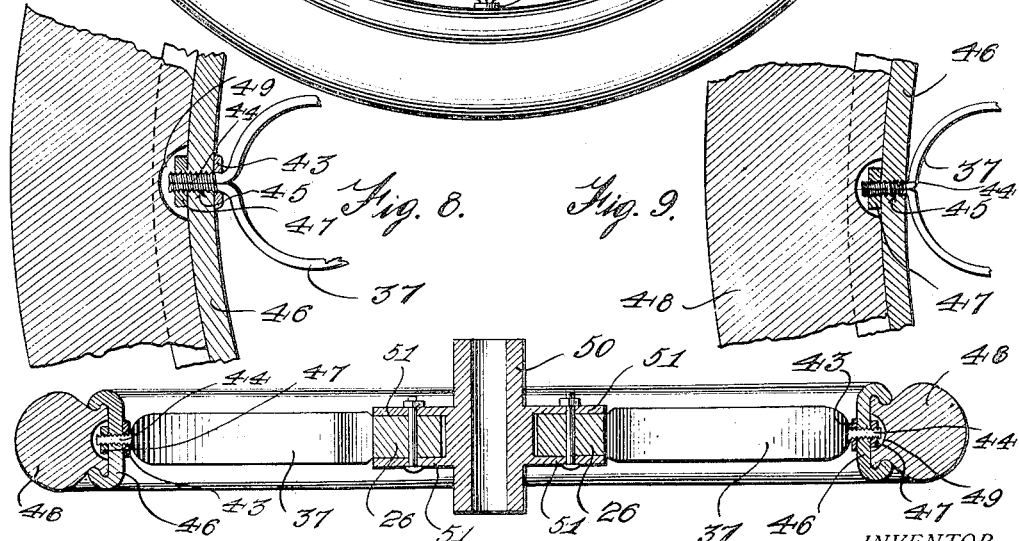
WITNESSES
INVENTOR
Winfield S. Hancock
By F. E. Grooman, his Attorney

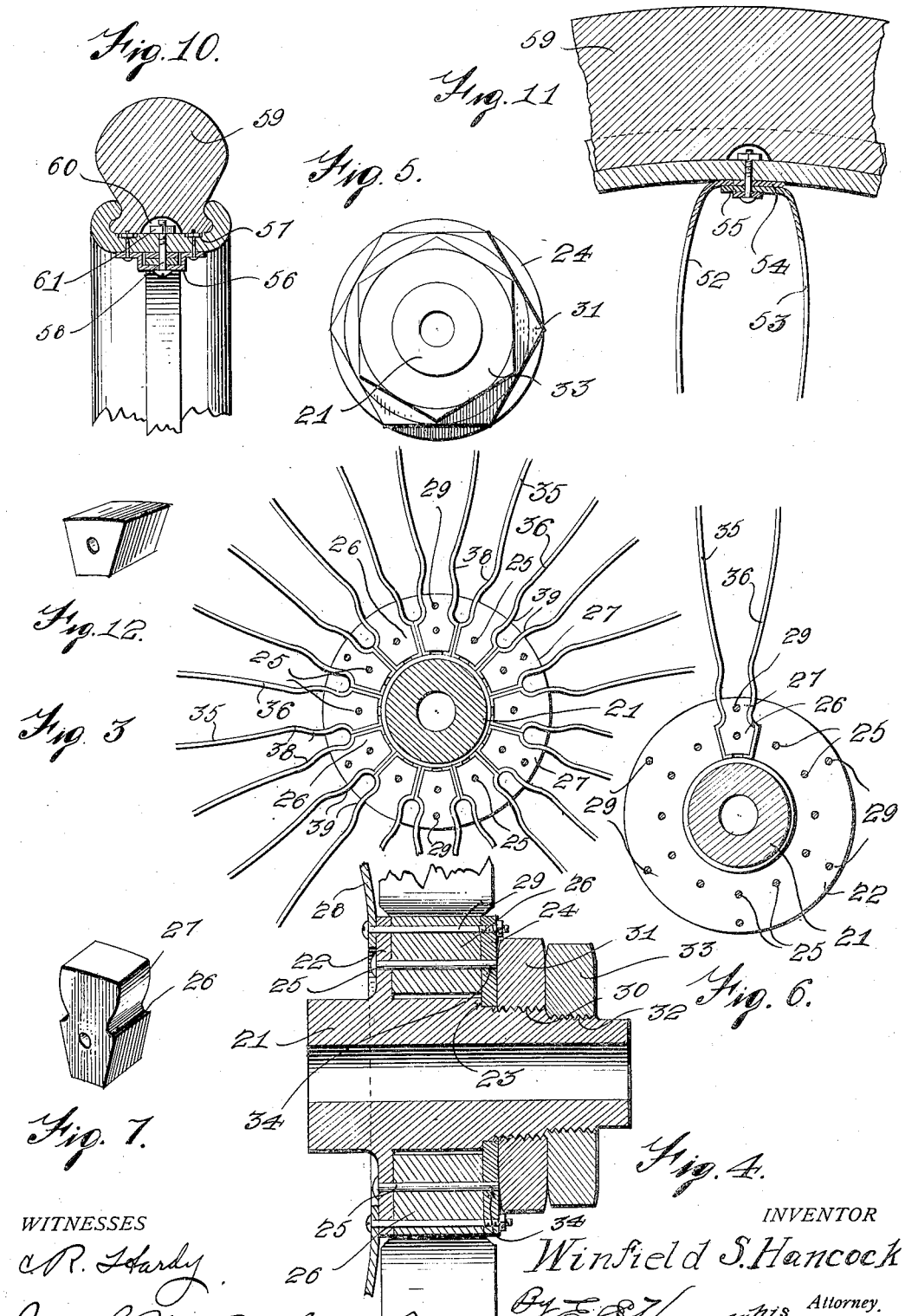

UNITED STATES PATENT OFFICE.

WINFIELD S. HANCOCK, OF WASHINGTON, DISTRICT OF COLUMBIA, ASSIGNOR OF THREE-FIFTHS TO AUGUSTA V. MITCHELL, OF WASHINGTON, DISTRICT OF COLUMBIA.

SPRING-WHEEL.

1,070,458.  Specification of Letters Patent.  Patented Aug. 19, 1913.

Application filed November 27, 1912. Serial No. 733,876.

*To all whom it may concern:*

Be it known that I, WINFIELD S. HANCOCK, a citizen of the United States, residing at Washington, in the District of Columbia, have invented certain new and useful Improvements in Spring-Wheels, of which the following is a specification, reference being had therein to the accompanying drawing.

This invention relates to spring wheels and has for its object the production of a spring wheel provided with resilient spokes arranged in such a manner that each spoke will share in supporting the hub of the wheel irrespective of the direction of pressure brought to bear upon the hub of the wheel.

Another object of this invention is to provide a simple and inexpensive wheel having a plurality of resilient supporting units easily assembled.

With these and other objects in view, this invention consists in general of certain novel constructions, combinations, and arrangements of parts, as will be hereinafter fully described and claimed.

In the drawing: Figure 1 is a side elevation of a wheel showing the hub portion thereof partly in section. Fig. 2 is a transverse sectional view through the wheel showing one form of the hub applied thereto. Fig. 3 is a transverse section through the hub of the wheel showing the spokes and securing means in elevation. Fig. 4 is a longitudinal section through the preferred embodiment of my hub used in connection with the present wheel. Fig. 5 is an end view of the hub of the wheel illustrated in Fig. 4 showing the position of the binding nuts thereon. Fig. 6 is a central transverse section through the hub showing one pair of spokes secured thereto. Fig. 7 is a detail perspective of one of the spoke spacing blocks. Fig. 8 is a longitudinal section through a portion of the felly and tire showing the manner of attaching the spokes to the felly. Fig. 9 is a longitudinal section similar to Fig. 8 showing a slightly modified form of attaching the spokes to the felly. Fig. 10 is a transverse sectional view through the felly and tire showing still another embodiment of connecting the outer ends of the spokes to the felly. Fig. 11 is a longitudinal section of a portion of the rim and tire taken at right angles to Fig. 10. Fig. 12 is a detail perspective of one form of spacing block used in connection with the hub upon an automobile wheel where no chain box is employed.

Referring to the drawings by numerals, 21 designates the hub of the wheel which is provided with an integral circumferential flange 22 and this hub is provided with a reduced shoulder portion 23 for receiving the clamping plate 24 which plate is adapted to fit over the opposite end of the hub, as illustrated in Fig. 4. This plate 24 is held in its correct position by means of the transversely extending rivets 25 which rivets pass through the spoke retaining blocks 26 thereby firmly holding the blocks 26 in engagement with the hub. The spoke retaining blocks 26 are provided with projecting ends 27 and these ends 27 constitute means for connecting the usual chain box 28 thereto. Bolts 29 pass through some of the blocks 26 as indicated in Figs. 1 and 4, for firmly holding the chain box in its correct position upon the wheel. The hub 21 is provided with an inner threaded portion 30 upon which the primary clamping nut 31 is threaded, and is also provided with a reduced threaded portion 32 upon which the auxiliary clamping nut 33 is threaded. The nuts by being threaded upon the hub as illustrated in Fig. 1, will firmly clamp the removable or clamping plate 24 in engagement with the hub whereby the plate will be held firmly in engagement with the hub. The rivets 25 are carried by the integral circumferential plate 22 as previously described, and the outer ends of the rivets are so formed as to fit within apertures 34 formed in the removable clamping plate 24 whereby the clamping plate may be easily removed from the hub when it is desired to remove one of the spokes from the wheel. Of course, it should be understood that the bolts 29 are only used upon the rear wheel of the automobile where the chain box 28 is ordinarily employed. Upon the wheels where no chain box is used, it should be understood that the spacing blocks will be formed so as to constitute a substantially wedge structure, as illustrated in Fig. 12. It will be further seen by carefully considering Fig. 4 that the binding nuts 31 and 32 will constitute a firm clamping means for the hub for retaining the spokes in engagement therewith.

The spokes employed in connection with the present wheel comprise a primary section 35 and an auxiliary section 36 which sections are firmly constructed and are formed so as to constitute a wide, outwardly bulged body portion 37 which terminates near its inner end in an inwardly bulged portion 38 which portion again terminates in a slightly gradually outwardly bulged portion 39 and being bent inwardly again constitutes a second slightly inwardly bulged portion 40. The inner end of each section then terminates in an inclined block engaging portion 41 and this inclined block engaging portion terminates in a laterally extending foot 42 for fitting under the clamping block 26 above described. The sections 35 and 36 are so placed as to have their laterally extending ends 42 extending toward each other as illustrated clearly in Fig. 1, and thereby constitute means for resisting the outward movement of the spokes relative to the hub. It will further be seen that the block 26 is so formed as to conform to the contour of the bulged portions 39 and 40 and this will, of course, assist in anchoring the spokes in engagement with the hub. It should be understood, and by carefully considering Fig. 1 of the drawing, it will be obvious that the spokes are not provided with any sharp or radical portions which would be likely to become broken as a result of constant wear and pressure thereon. The gradually curved portions of the spokes will constitute sufficient resiliency for the spokes for accomplishing the desired purpose, but no sharp or abrupt turns are formed upon the spokes which would be likely to cause the same to break under undue pressure. The sections 35 and 36 have their outer ends bent inwardly toward each other so as to extend parallel and are then threaded for receiving a clamping nut 43 which nut constitutes means for holding the sections 35 and 36 together. The threaded end 44 of the spokes are then placed through the apertures 45 of the felly 46 and a retaining nut 47 is threaded upon the outer end thereof for constituting means for preventing the spokes from drawing away from the felly.

As illustrated in Fig. 9 the spokes may be positioned in engagement with the felly 46 without the clamping nut 43 by having the bulged portions 37 of the spokes come in contact with the felly as indicated clearly in Fig. 9. The tire 48 may, of course, consist of a solid rubber tire, a pneumatic tire, a semi-pneumatic tire, or any other desired tire, and still perform the same function as ascribed to the present solid tire illustrated. It is preferable to provide the tire with a notched portion 49 for allowing the nut 42 and threaded end 44 of the sections of the spokes to fit therein without coming in frictional engagement with the tire. The tire may, if so desired, be provided with a longitudinally extending groove along its under face for receiving the nuts in place of the pockets which are illustrated in Figs. 8 and 9.

As illustrated in Fig. 2, the hub 50 may be provided with a plurality of integral circumferential flanges 51 for receiving the spacing or spoke clamping blocks 26. Of course, it should be understood that these blocks 26 may be formed of metal, fiber, or any other material convenient for accomplishing the desired purpose without departing from the spirit of the invention.

In Figs. 10 and 11, I have shown a modified form of the invention wherein the ends of the spoke sections 52 and 53 are overlapped so as to constitute clamping feet 54 and 55. A substantially U-shaped retaining clamp 56 straddles the overlapping feet 54 and 55 and this clamp has its ends secured to the felly by means of the clamping bolts 57. A retaining bolt 58 passes through the overlapping feet 54 and 55 of the spoke sections 52 and 53 and thereby firmly hold the feet in their correct position in connection with the rim. As explained with reference to Figs. 8 and 9 the tire 59 may be provided with a plurality of notches 60 for receiving the nuts 61 positioned upon the bolts 56.

From the foregoing description, it will be seen that a very simple and efficient means has been produced whereby the spokes will be conveniently assembled and connected to the hub and rim of the wheel. It should be further obvious that in case one of the sections of the spokes should become broken or fractured, the same may be replaced by another section similar thereto within a very short time.

It should be understood that the spokes as illustrated and described in the present application may be applied to any style wheel which is now placed upon the market without departing from the spirit of the invention. It should be also noted by carefully considering the drawings that the sockets formed in the under face of the tire to receive the retaining bolts of the spokes will constitute means for preventing the tire from slipping upon the felly, in view of the fact that the bolts fitting in the sockets will constitute anchoring means for the tire. It should also be noted that in so far as the shape of the spokes and the means for securing them at the hub are concerned it is not of consequence how the two sections are united at the rim or how the spoke is secured to the rim, and I therefore intend to claim these features broadly.

Having thus described the invention, what is claimed as new, is:—

1. A spoke for spring wheels made up of two similarly shaped oppositely facing resilient sections adapted to be secured to the felly of a wheel at one end where the sections come together and symmetrically bowed outwardly from that end, the curvature being continued to a point where the sections approach each other near the opposite end of the spoke, the said sections having a gradual reverse or outward curve beyond said last mentioned point, and the said sections terminating in straight separated ends bent inward toward each other at an acute angle.

2. A spring wheel comprising a hub, a felly and a plurality of resilient metal spokes, each spoke being made up of two similarly shaped oppositely facing portions, the inner ends next to the hub being flat and straight for a short distance radial of the wheel and each having an inward bulge or bend toward the other above said straight ends, and an outward bend or bulge above said inward bend, the upper ends of said portions coming together on a symmetrical curve at the felly, means for securing said spokes to the felly, blocks fitting between the flat radial ends of the portions up to the point where the portions are inwardly bent over said blocks, and means for securing said blocks to the hub.

3. A spring wheel comprising a hub, a felly, a plurality of spokes, each spoke being made up of two similarly shaped oppositely facing sections of resilient metal strips secured to the felly at one end and symmetrically bowed outward from each other from that point inwardly toward the hub, the curvature being continued to such an extent that the sections approach each other near the hub, the said sections having a reverse or outward curve as they approach the hub terminating in flat end sections radial of the wheel with their ends reaching in to the hub, blocks having radial sides fitting within said radial ends and extending outward from the hub to the point where the sections have the reverse or outward curve whereby the sections will extend inwardly toward each other immediately over said blocks, and means for securing said blocks in place on the hub.

4. A spring wheel of the class described, comprising a hub, a felly, and spring spokes secured thereto, each made up of two portions, said hub comprising a body portion and a plate carrying on its face a series of blocks equal in number to the spokes around the circumference having radial sides, adjacent blocks being separated a distance equal to twice the thickness of the material of the spokes and each spoke having the ends of its two portions bent at such an angle to each other and so separated as to fit against opposite sides of a block, a removable plate fitting over said hub against said blocks and against the sides of said spokes at the ends, and means for securing said plate in place.

5. A spring wheel of the class described comprising a hub, a felly, a plurality of spring spokes, each spoke comprising a pair of similarly constructed sections comprising an elongated gradually inwardly bent body, each section terminating in an outwardly, widely bulged end and being gradually bent to constitute a pair of parallel threaded ends for each spoke, and means threaded upon said ends for firmly holding the same in engagement with said felly.

6. A spring wheel of the class described comprising a hub, a felly, a plurality of spring spokes, each spoke comprising an elongated resilient body portion having outwardly bulged portions, said outwardly bulged portions terminating in a laterally extending end, the laterally extending end of one section lying flat against the laterally extending end of the other section, said sections being threaded upon their outer faces, a clamping nut threaded upon said laterally extending ends for limiting the inward movement of said sections relative to said felly, and a retaining nut threaded upon the outer ends of said laterally extending ends for firmly holding said sections in engagement with said felly.

In testimony whereof I hereunto affix my signature in presence of two witnesses.

WINFIELD S. HANCOCK.

Witnesses:
   IRVING L. McCATHRAN,
   H. B. VROOMAN.